(12) United States Patent
Gotoh et al.

(10) Patent No.: US 7,623,265 B2
(45) Date of Patent: Nov. 24, 2009

(54) IMAGE PROCESSING APPARATUS, IMAGE FORMING APPARATUS, AND IMAGE PROCESSING METHOD

(75) Inventors: Makio Gotoh, Nara (JP); Masanori Minami, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 573 days.

(21) Appl. No.: 11/391,808

(22) Filed: Mar. 28, 2006

(65) Prior Publication Data

US 2006/0215194 A1 Sep. 28, 2006

(30) Foreign Application Priority Data

Mar. 28, 2005 (JP) .............................. 2005-092986

(51) Int. Cl.
*H04N 1/46* (2006.01)
(52) U.S. Cl. .................... 358/1.9; 358/3.06; 358/534
(58) Field of Classification Search .................. 358/1.1, 358/1.9, 2.1, 3.01, 3.06, 3.21, 3.24, 501, 358/534
See application file for complete search history.

(56) References Cited

U.S. PATENT DOCUMENTS 5,341,226 A * 8/1994 Shiau ......................... 358/518
5,900,952 A * 5/1999 Fan ............................ 358/518
6,178,260 B1 * 1/2001 Li et al. ...................... 382/173
6,560,351 B1 5/2003 Hirota

FOREIGN PATENT DOCUMENTS

| JP | 08-251406 A | 9/1996 |
| JP | 2000-36907 A | 2/2000 |
| JP | 2002-77623 A | 3/2002 |
| JP | 2003-219178 | 7/2003 |
| JP | 2004-096535 | 3/2004 |

* cited by examiner

*Primary Examiner*—Thomas D Lee
(74) *Attorney, Agent, or Firm*—Edwards Angell Palmer & Dodge LLP

(57) ABSTRACT

As the color conversion process for image data of an RGB signal, a color correction section 26 performs a color correction process, and a black generation and under color removal section 27 performs a black generation and under color removal process. In the color conversion process, the color correction section 26 and the black generation and under color removal section 27 are supplied with a halftone frequency recognized by a halftone frequency recognition section 23. The color correction section 26 and the black generation and under color removal section 27 change the process based upon the halftone frequency. As a result, an image processing apparatus is realized in which improved image quality can be produced by an optimum image process that is performed on an image containing a halftone area depending upon the halftone frequency of the halftone area so that image quality is improved.

9 Claims, 12 Drawing Sheets

FIG. 3 (a)
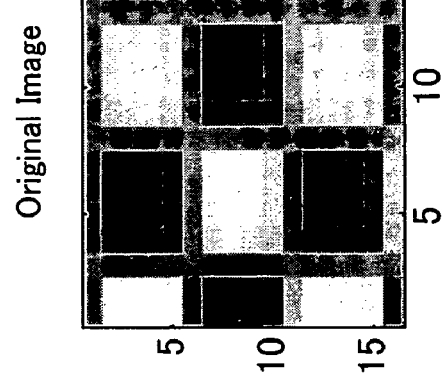
Original Image
FIG. 3 (b)
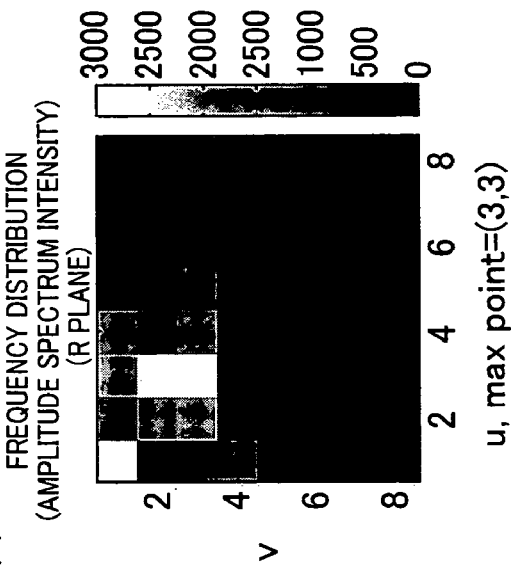
FIG. 3 (d)
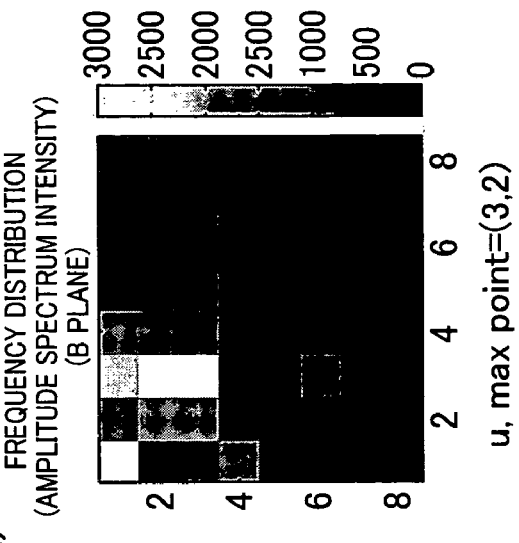
FIG. 3 (c)

IMAGE PROCESSING APPARATUS, IMAGE FORMING APPARATUS, AND IMAGE PROCESSING METHOD

This Nonprovisional application claims priority under 35 U.S.C. § 119(a) on Patent Application No. 92986/2005 filed in Japan on Mar. 28, 2005, the entire contents of which are hereby incorporated by reference.

BACKGROUND OF THE INVENTION

1. Field of the Invention

The present invention relates to an image processing apparatus that performs an image process on image data for printing. More particularly, the present invention relates to an image processing apparatus that performs a high quality color conversion process in printing a document constituted of halftone areas.

2. Description of the Related Art

In the field of image forming apparatuses, such as copying-machines or printers, that adopt an electrophotographic process or an inkjet printing system, multi-color digital copying-machines and multi-function printers that can reproduce color images with high image quality have been commercialized, due to advancements in digital image processing technology.

Such an image forming apparatus copies document images containing text, line drawings, pictures, or combinations thereof. In order to desirably reproduce such document images, it is necessary to perform an appropriate image process on each type of document image.

Under these circumstances, various operation modes, such as a text mode, a text/picture mode, and a picture mode, are available in the image forming apparatuses. One of the operation modes is selected based upon a document type, and then an image process based upon the selected operation mode is carried out.

It is, however, extremely bothersome for a user to switch the operation modes for each document. Moreover, if the user selects an inappropriate mode, then an inappropriate image process is carried out to the document. This often leads to image deterioration, resulting in wasted copy.

As a way to solve the above problems, Japanese Unexamined Patent Publication No. 251406/1996 (Tokukaihei 8-251406 (published on Sep. 17, 1996)) and Japanese Unexamined Patent Publication No. 36907/2000 (published on Feb. 2, 2000) teach automatically discriminating a document type in the image forming apparatus, so as to use different image processes depending on the result of discrimination.

Japanese Unexamined Patent Publication No. 251406/1996 teaches (i) segmenting supplied image data into a line-only area, a halftone-only area, a continuous-tone-image-only area, or a combination thereof, and (ii) switching g a filter process, a color correction process, and a tone process depending on the result of segmentation.

Further, Japanese Unexamined Patent Publication No. 36907/2000 teaches calculating a gloss level of a document to select an appropriate image mode (text/picture mode or picture mode) based upon the gloss level (color correction process and γ correction process are switched based upon the selected image mode).

However, Japanese Unexamined Patent Publication No. 251406/1996 has a problem that an appropriate image process would not be carried out to, especially, an image containing a halftone area. The following specifically describes the problem.

Usually, an image forming apparatus adopting the electrophotographic system or the inkjet printing system performs a color conversion process so as to convert supplied image data of a first color space (i.e., RGB (red, green, blue)) into data of a second color space (i.e., CMY (cyan, magenta, yellow) or CMYK (cyan, magenta, yellow, black)) that is more suitable as an output of an image forming section.

Generally, the image forming apparatus has a narrower gamut than a printed-picture (an image constituted of halftone areas) or a photographic-picture (an image constituted of continuous-tone areas). Therefore, in printing the printed-picture or the photographic-picture by the image forming apparatus, if the color correction process is performed by placing importance on the tone, then images are reproduced with paler colors than original colors. On the other hand, if importance is placed on the density or the color saturation, tones tend to be reproduced inaccurately. Especially in printing a document containing a high frequency halftone (document with high image quality, such as a book of fine art), the image quality deteriorates.

Further, in printing a document containing a low frequency halftone (e.g., newspapers), an attempt to accurately reproduce pale colors of halftone areas (e.g., pictures) in the document causes the following problem. Specifically, if the document itself is colored (e.g., newspapers), the color of the page-background is also reproduced. This causes poor reproduction of text.

Thus, in processing an image containing a halftone area, different factors need to be taken into consideration depending upon whether the document is a high frequency halftone document or a low frequency halftone document. It is therefore preferable to perform an image process that is more segmented. The method of Japanese Unexamined Patent Publication No. 251406/1996, however, does not allow a halftone area to be further segmented for determination. Accordingly, one type of process is performed on all halftone areas. This may cause deterioration of image quality depending on the document type.

Further, Japanese Unexamined Patent Publication No. 36907/2000 teaches measuring a gloss level of the document when the image mode is either the text/picture mode or the picture mode. This enables one to perform more segmented discrimination of the pictures (halftone areas). However, in order to discriminate by detecting a gloss level of the document, it is required to include a sensor for detecting a specular reflection component from the document, and a member for calculating the gloss level.

SUMMARY OF THE INVENTION

In view of the above problems, the present invention has as an object to realize an image processing apparatus that performs an optimum image process on an image containing a halftone area, based upon a document type or a halftone frequency of the halftone area, in order to improve image quality.

In order to achieve the above object, an image processing apparatus of the present invention includes: a color conversion process section that converts color image data of a first color space into color image data of a second color space based on a predetermined color conversion process; and a process changing section that changes the color conversion process based upon a halftone frequency recognized from the color image data of the first color space.

With the above structure, the color conversion process for printing out the image is changed, based upon the halftone frequency of the halftone area, before the color conversion process (e.g., conversion from RGB into CMY, from CMY into CMYK, from RGB into CMYK) is performed on the image data containing the halftone area.

This makes it possible to, for example, perform a color conversion process suitable for super fine printing. Specifically, colors of image data containing a high frequency halftone are reproduced in such a way that tones of high-density areas (dark black, vivid colors) are not deteriorated, and pale colors of low-density areas are also accurately reproduced. On the other hand, colors of image data containing no high frequency halftone are reproduced such that contrast of the document is maintained to finely reproduce text, graph, or the like. This enables performance of the color conversion process suitable for printing text (or text/printed-picture document) or ordinary printing. The color conversion process is changed based upon the halftone frequency, which was not taken into consideration in conventional processes, so that an appropriate image process is performed based upon the document type or the halftone frequency of the halftone area. Accordingly, the image quality is improved.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 3(*a*) shows an original document with a halftone frequency of 85. FIGS. 3(*b*) to 3(*d*) show frequency distribution (amplitude spectrum intensity) of an R plane, a G plane, and a B plane of the original document, respectively.

FIGS. 4(*b*) to 4(*d*) show frequency distribution (amplitude spectrum intensity) of an R plane, a G plane, and a B plane of the original document, respectively.

FIGS. 5(*b*) to 5(*d*) show frequency distribution (amplitude spectrum intensity) of an R plane, a G plane, and a B plane of the original document, respectively.

DESCRIPTION OF THE EMBODIMENTS

The following describes one embodiment according to the present invention, with reference to Figures. First of all, a structure of an image forming apparatus adopting an image processing apparatus of the present embodiment will be outlined, with reference to FIG. 1.

Figure 1:
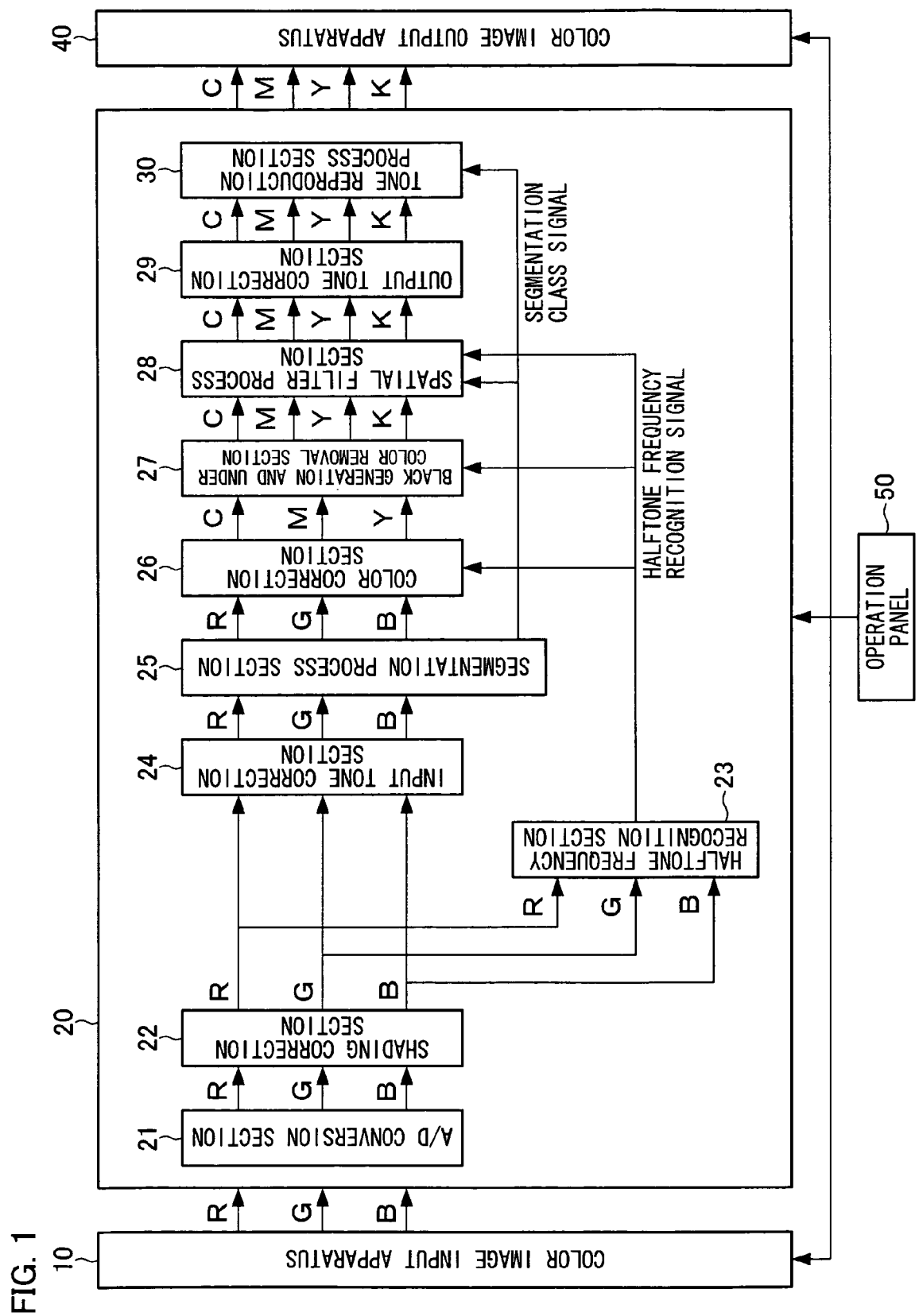
FIG. 1 is a block diagram illustrating a structure of a main part of an image forming apparatus according to an embodiment of the present invention.

As illustrated in FIG. 1, the image forming apparatus according to the present embodiment is constituted of a color image input apparatus 10, an image processing apparatus 20, a color image output apparatus 40, and an operation panel 50. The operation panel 50 is provided with setting buttons or a numeric keypad for selecting an operation mode of the image forming apparatus (e.g., digital copying machine). The operation panel 50 is also provided with a display section realized by, for example, a liquid crystal display.

The color image input apparatus 10 is realized by, for example, a scanner. The color image input apparatus 10 reads a reflection light image in the form of an RGB (R: red, G: green, B: blue) analog signal via a CCD (Charge Coupled Device).

The color image output apparatus 40 is supplied with image data on which the image processing apparatus 20 has performed a predetermined image process. The color image output apparatus 40 prints out the supplied image data.

The image processing apparatus 20 is constituted of an A/D (analog/digital) conversion section 21, a shading correction section 22, a halftone frequency recognition section 23, an input tone correction section 24, a segmentation process section 25, a color correction section 26, a black generation and under color removal section 27, a spatial filter process section 28, an output tone correction section 29, and a tone reproduction process section 30.

The A/D conversion section 21 converts the analog signal, which was read by the color image input apparatus 10, into a digital signal.

The shading correction section 22 performs a shading correction process to correct various distortions generated in systems of the color image input apparatus 10 (illumination system, focusing system, and image capturing system). Further, the shading correction section 22 corrects a color balance of the RGB signals (reflectance signals of RGB) from which a variety of distortions have been removed. Further, the shading correction section 22 converts the RGB signal into a signal (e.g., density signal) that can be easily handled in the image processing system adopted by the color image processing apparatus.

The halftone frequency recognition section 23 calculates a halftone frequency of a document. The halftone frequency calculated by the halftone frequency recognition section 23 is transmitted, in the form of a halftone frequency recognition signal, to the color connection section 26, the black generation and under color removal section 27, and the spatial filter process section 28.

The input tone correction section 24 subtracts a density of the page-background area. Further, the input tone correction section 24 adjusts image quality such as contrast.

The segmentation process section 25 segments, based upon the RGB signal supplied by the input tone correction section 24, pixels of supplied image into a text area, a halftone area, or a picture area. The segmentation process section 25 creates, based upon a result of the segmentation process, a segmentation class signal indicating which area each pixel belongs to. The segmentation process section 25 transmits the segmentation class signal to the color correction section 26, the black generation and under color removal section 27, the spatial filter process section 28, and the tone reproduction process section 30.

The color correction section 26 performs a color correction process for eliminating color impurity including useless absorption components according to spectral characteristics of CMY (C: Cyan, M: Magenta, Y: Yellow) colorant.

The black generation and under color removal section 27 performs a black generation process. In the black generation process, the black generation and under color removal section 27 creates a black (K) signal on the basis of a three-color CMY signal to which the color correction process has been performed. Further, the black generation and under color removal section 27 performs an under color removal process. In the under color removal process, the black generation and under color removal section 27 removes the K signal, which was created in the black generation process, from the original CMY signal, thereby creating a new CMY signal. As a result of these processes (black generation process, under color removal process), the three-color CMY signal is converted into a four-color CMYK signal.

The spatial filter process section 28 performs a spatial filter process using a digital filter, and corrects characteristics of spatial frequency, thereby preventing blur or deterioration of graininess in the produced image.

The output tone correction section 29 performs an output tone correction process. In the output tone correction process, the output tone correction section 29 converts a signal (e.g., density signal) into a halftone area ratio, which is a feature adopted by the color image output apparatus 40.

The tone reproduction process section 30 performs a tone reproduction process (halftone generation process). By the tone reproduction process, an image is segmented into pixels so that respective tones of the pixels are reproduced.

With respect to an image area extracted as either a black text area or a color text area by the segmentation process section 25, in order to improve reproducibility of black or color text, the spatial filter process section 28 performs a sharpness enhancement process with enhanced effect in an upper frequency range. Simultaneously, in a halftone generation process by the tone reproduction process section 30, a high resolution screen suitable for high frequency reproduction is selected, and either a binarize process or a multi-level halftone process is carried out using the selected high resolution screen.

With respect to an area determined as the halftone area, the spatial filter process section 28 performs a low pass filter process so as to eliminate a halftone dot pattern contained in the supplied image. Further, the tone reproduction process section 30 performs either the binarize process or the multi-level halftone process on a screen in the halftone generation process in such a way as to place importance on the tone reproducibility. With respect to an area segmented into the picture area (continuous tone image area such as the photographic-picture area) by the segmentation process section 25, the tone reproduction process section 30 performs either the binarize process or the multi-level halftone process on a screen in such a way as to place importance on the tone reproducibility.

The image data on which the above processes were performed is temporarily stored in storage means (not illustrated), and is read and transmitted at a predetermined timing to the color image output apparatus 40. This is performed by a CPU (Central Processing Unit). The color image output apparatus 40 prints out image data on a recording medium (such as papers). Examples of the color image output apparatus 40 include: a color image forming apparatus adopting the electrophotographic system; and a color image forming apparatus adopting the inkjet printing system. However, the color image forming apparatus is not limited to these examples.

In the image forming apparatus 20 illustrated in FIG. 1, the halftone frequency recognition section 23 transmits a halftone frequency discrimination signal to the color correction section 26, the black generation and under color removal section 27, and the spatial filter process section 28. The image forming apparatus 20 has a characteristic that processes to be performed by the color correction section 26 and the black generation and under color removal section 27 are changed based upon the halftone frequency recognized by the halftone frequency recognition section 23. This characteristic will be explained in detail below.

First, the following explains an exemplary method for calculating a halftone frequency, which method is performed by the halftone frequency recognition section 23. Various methods for calculating a halftone frequency, however, have been proposed conventionally. It is well known that an image forming apparatus utilizes a halftone frequency of a document so as to reduce more generated in the filter process. Therefore, in the present invention, the method for calculating a halftone frequency is not limited to a particular method.

In the following explanation of the method for calculating a halftone frequency, M×N pixels including a current pixel at the center thereof is set by masking. The mask size is usually set in such a way that M and N each takes the value $2^k$. This is because a frequency analysis process is carried out utilizing a FFT (Fast Fourier Transform) process. In the following explanation, the values are defined as M=16 and N=16 (k=4).

Figure 2:
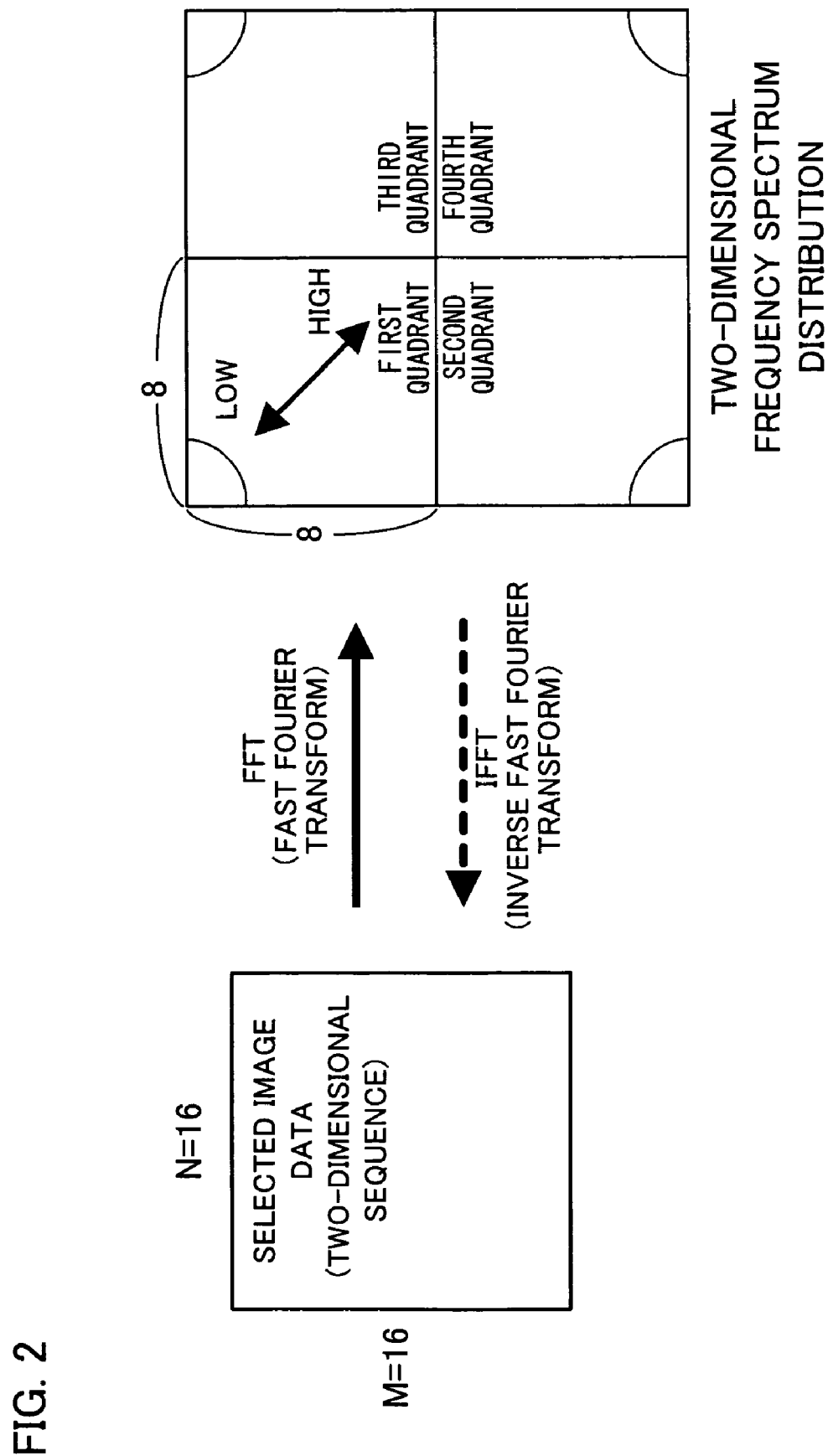
FIG. 2 is a diagram showing a relationship between (i) an image area that was specified by masking used in a halftone frequency obtaining process performed on a halftone area and (ii) a two-dimensional frequency spectrum distribution.

With respect to image data whose halftone frequency is to be calculated, as illustrated in FIG. 2, an area of M×N pixels in the image data is specified (image is selected) by masking. Then, the FFT process is performed on the specified area. As a consequence of the FFT process, a real space domain is transformed into a frequency domain, and a two-dimensional frequency spectrum distribution is obtained. The transformation is generally calculated according to formula (1) below:

$$F(u,v) = \int\int Mask^{I}(x,y) \exp[-j2\pi \cdot (ux+vy)] dx dy \tag{1}$$

With respect to the image data whose halftone frequency is to be calculated, the FFT process is performed while the current pixel is shifted (i.e., shifting the area specified by masking). As a consequence of the FFT process, an amplitude spectrum intensity is obtained. By utilizing the amplitude spectrum intensity of Fourier Transform, frequency distribution of the respective areas specified by masking are obtained.

Exemplary results of the FFT performed on image data of a representative frequency halftone (amplitude spectrum intensity of |F(u,v)|) are shown in figures. FIGS. 3(a) to 3(d) show results of FFT performed on image data with an 85-line (unit: line per inch) halftone. FIGS. 4(a) to 4(d) show results of FFT performed on image data with a 150-line halftone. Finally, FIGS. 5(a) to 5(d) show results of FFT performed on image data with a 200-line halftone.

Figure 4:
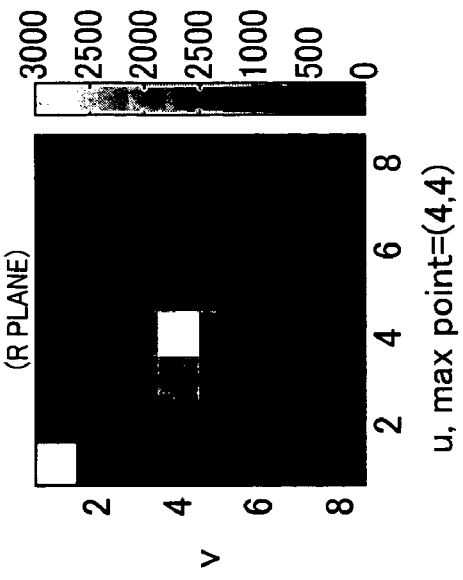
FIG. 4(*a*) shows an original document with a halftone frequency of 150.
Figure 4:
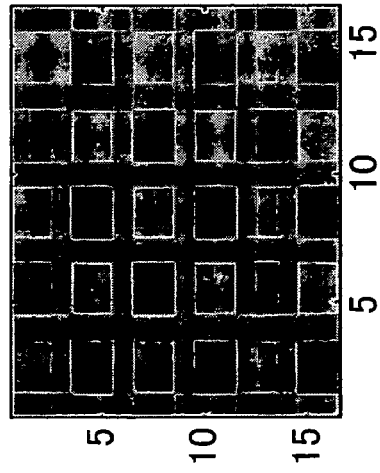
Figure 4:
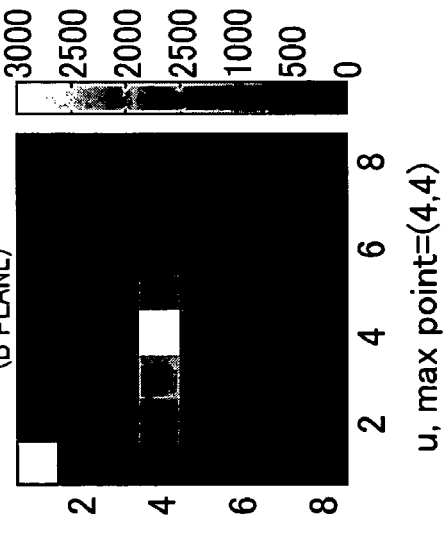
Figure 4:
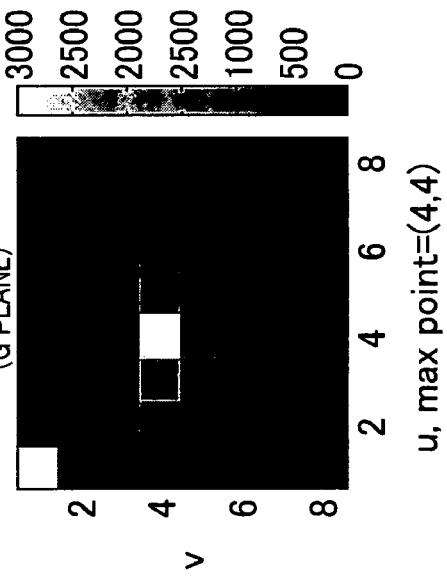
Figure 5:
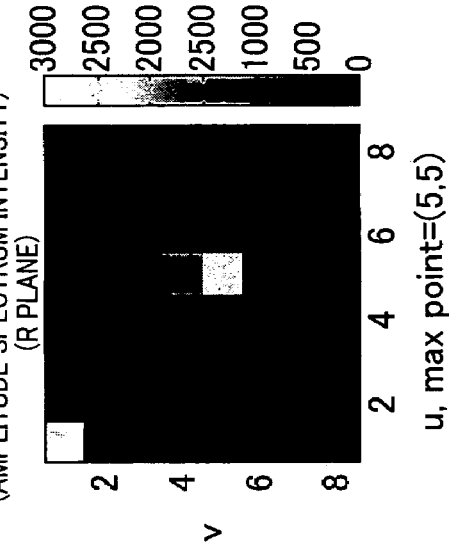
FIG. 5(*a*) shows an original document with a halftone frequency of 200.
Figure 5:
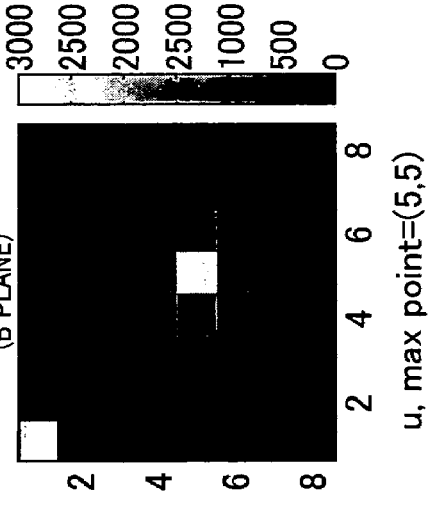
Figure 5:
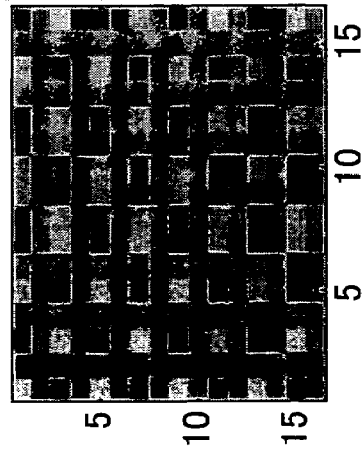
Figure 5:
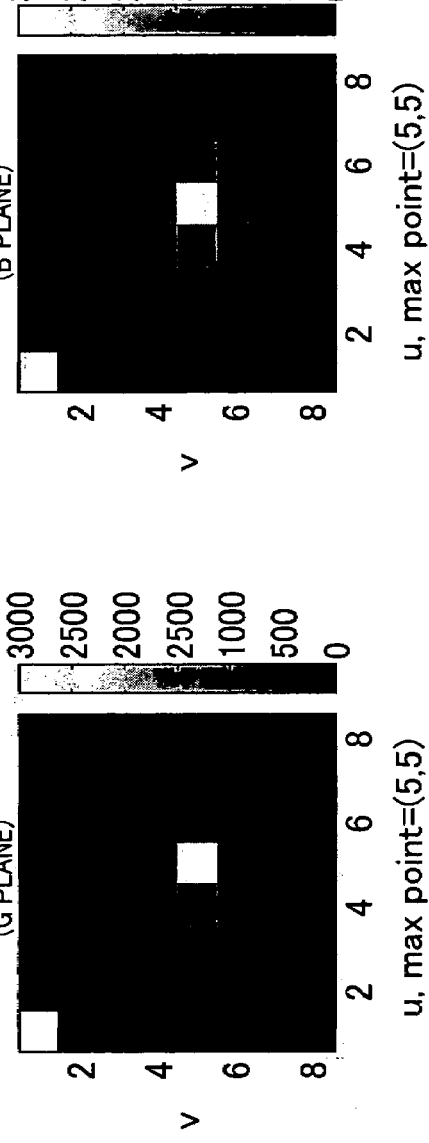

FIGS. 3(a), 4(a), and 5(a) are enlarged diagrams of original document (i.e., enlarged diagrams of halftones). FIGS. 3(b), 4(b), and 5(b) are diagrams of frequency distribution (amplitude spectrum intensity) of R (red) plane. FIGS. 3(c), 4(c), and 5(c) are diagrams of frequency distribution (amplitude spectrum intensity) of G (green) plane. Finally, FIGS. 3(d), 4(d), and 5(d) are diagrams of frequency distribution (amplitude spectrum intensity) of B (blue) plane.

In FIGS. 3(b) to 3(d), FIGS. 4(b) to 4(d), and FIGS. 5(b) to 5(d) showing the frequency distribution of the respective color components, the horizontal axis indicates "u" whereas the vertical axis indicates "v". Further, the amplitude spectrum intensities are expressed with different levels of color darkness (see the right-hand side of the respective figures). Further, the figures show frequency distribution for the input blocks. The upper left point where u=v=0 indicates a DC component, whereas the index (power) to which u=1, . . . , 8 or v=1, . . . , 8 are raised indicate AC components. Further, the frequency increases from left to right, and from top to bottom. The index indicates the extent of a corresponding frequency component contained.

The index concentrates where the amplitude spectrum intensities of the respective halftone frequencies are concentrated. Specifically, with regard to the low frequency halftones, the index concentrates in regions closer to the upper left side (the left-hand side or the upper side). On the other hand, with regard to high frequency halftones, the index concentrates in regions closer to the lower right side (the right-hand side or the lower side). This is because a low frequency halftone is constituted of halftone dots containing many low frequency components whereas a high frequency halftone is constituted of halftone dots containing many high frequency components. Accordingly, if the frequency characteristic of an area discriminated as the halftone area is obtained, and the frequency component included in the halftone area is calculated, then the halftone frequency can be discriminated.

Figure 6:
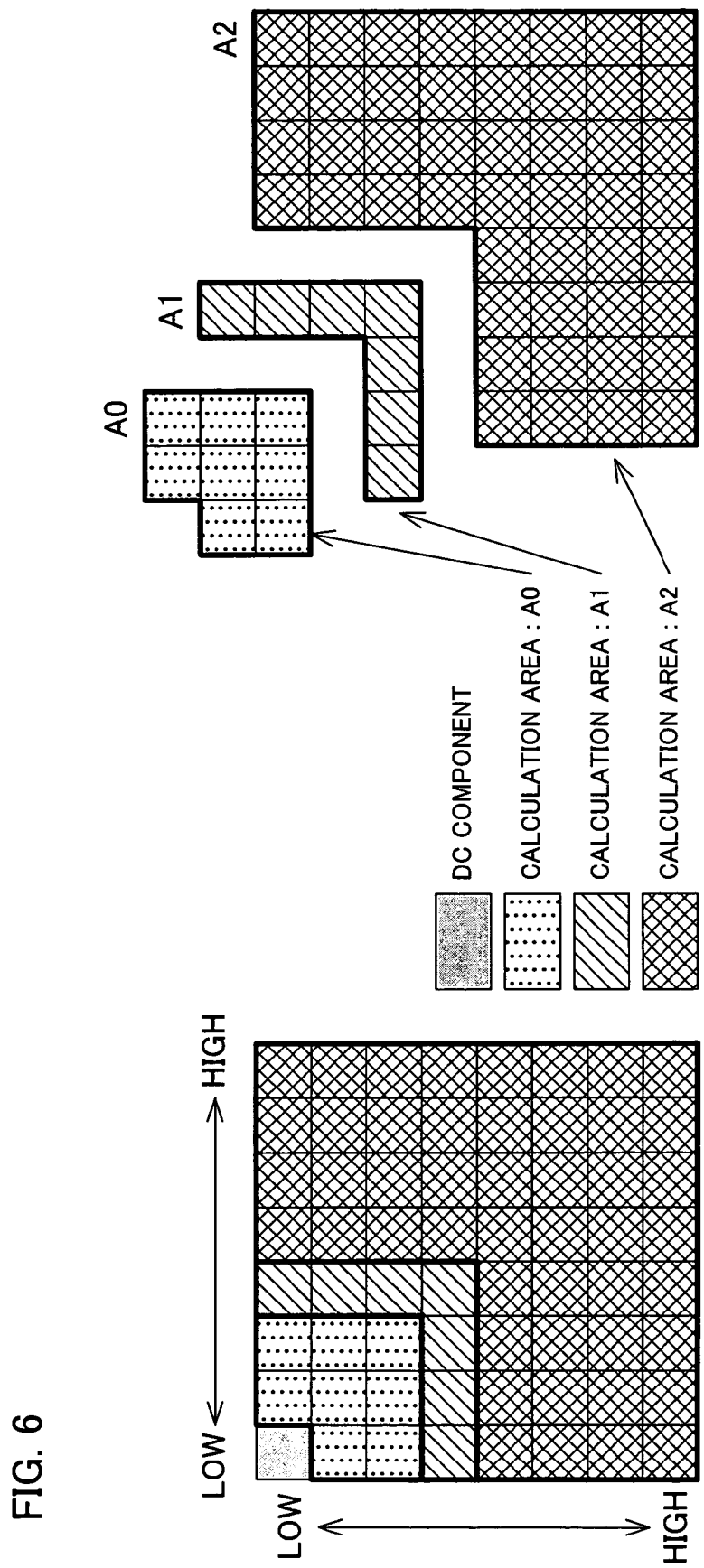
FIG. 6 shows segmentation of areas at the time of determining the halftone frequency based upon a diagram showing the amplitude spectrum intensity.

Specifically, the halftone frequency is determined based upon how the frequency distribution is distributed in the frequency domain. In order to do so, the respective figures indicating the amplitude spectrum intensities are segmented into areas (areas $A_0$ to $A_2$), as illustrated in FIG. 6. A sum of the indices is calculated for each area, and the calculated sum is divided by the number of pixels contained in the area in order to obtain a normalized value. Then, based upon the normalized value, it is determined in which area a peak of the frequency components is found.

If the peak is in the area $A_0$, then the halftone frequency is determined as the low frequency halftone. If the peak is in the area $A_1$, then the halftone frequency is determined as the intermediate frequency halftone. Finally, if the peak is in the area $A_2$, then the halftone frequency is determined as the high frequency halftone.

The following is an exemplary way to discriminate a document based upon the determined halftone frequency. If the halftone frequency is determined as the low frequency halftone (100 lines or below), then the document is determined as a low image quality document (e.g., newspaper, telephone directory, flyer). If the halftone frequency is determined as the high frequency halftone (200 lines or above), then the document is determined as a high image quality document (e.g., photo album, catalog of luxury items). Finally, if the halftone frequency is determined as the intermediate halftone frequency (101 lines to 199 lines, inclusive), then the document is determined as ordinary prints. Here, three categories (high frequency halftone, intermediate frequency halftone, low frequency halftone) are used, but the number of categories may be two, four, or more than four.

Once the halftone frequency of the document is recognized, the halftone frequency recognition section 23 transmits a halftone frequency discrimination signal to the color correction section 26, the black generation and under color removal section 27, and the spatial filter process section 28. Based upon the halftone frequency discrimination signal, the color correction section 26 and the black generation and under color removal section 27 change the processes they perform. The changing of the processes will be specifically explained below.

Figure 7:
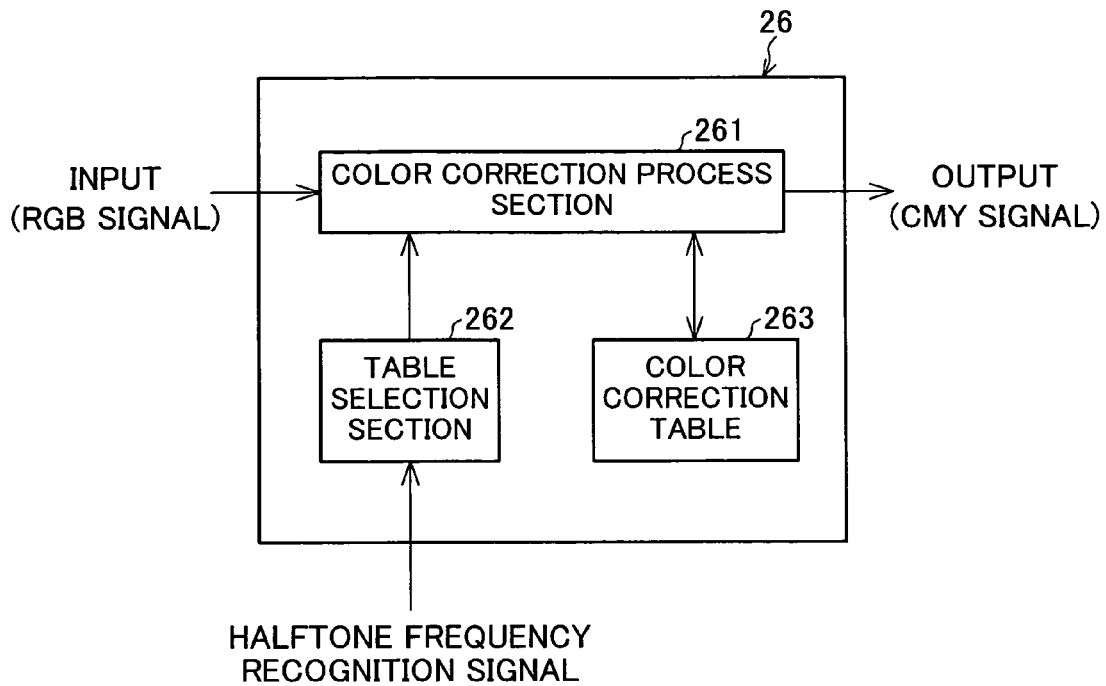
FIG. 7 is a block diagram illustrating an exemplary structure of a color conversion section of the image forming apparatus illustrated in FIG. 1.

First, the following explains an exemplary way of changing the color conversion process to be performed by the color correction section 26, with reference to FIG. 7. An ordinary image forming apparatus (e.g., copying machine, printer) performs the color conversion process by (i) reading, from a look-up table (color conversion table), a CMY signal corresponding to an inputted RGB signal and (ii) outputting the CMY signal. For this purpose, the color correction section 26 illustrated in FIG. 7 is provided with a color correction process section (color conversion process section) 261, a table selection section (process changing section) 262, and a color correction table (color conversion process) 263.

In the structure of FIG. 7, when an RGB signal is inputted to the color correction section 26, the color correction process section 261 reads, from the color correction table 263, an output value corresponding to the inputted value. As a result, the RGB signal is converted into a CMY signal. The color correction table 263 includes two types of look-up tables: a table A (color correction process A) and a table B (color correction process B). Based upon the halftone frequency discrimination signal, the color correction process section 261 switches the table to be referred to, so as to change the color correction process.

The table selection section 262 switches the table A (color correction table A) and the table B (color correction table B). Specifically, the table selection section 262 detects the halftone frequency discrimination signal supplied to the color correction section 26. Then, based upon the detected signal, the table selection section 262 notifies the color correction process section 261 which table to refer to. In accordance with the notification by the table selection section 262, the color correction process section 261 switches the table to refer (access) to for the color correction process.

In the present invention, however, more tables may be prepared and switched. Further, in the case where the look-up table is not utilized for the color correction process, and instead, inputted data is subjected to color correction and converted into output data according to a calculation formula (e.g., masking equation), the calculation formula may be changed depending upon the halftone frequency discrimination signal. Further, a coefficient (parameter) of the calculation formula may be changed so as to change the color correction process.

In the color correction process A utilizing the table A, the color reproduction is performed as follows. In the high density area (dark black, vivid colors), the color reproduction is performed in such a way that tones are not deteriorated. On the other hand, in the low density area, the color reproduction is performed in such a way that pale colors are accurately reproduced. The table A can thus perform a color correction process suitable for super fine printing.

In the color correction process B utilizing the table B, the color reproduction is performed in such a way that contrast of a document is maintained in order to finely reproduce text, graph, etc. The table B can thus perform a color correction process suitable for printing text (or text/printed-picture document) or ordinary printing. Because the low frequency halftone document (e.g., newspaper) contains no high-saturation (high-density) color, it is preferable in the printing of the low frequency halftone document that the table B be utilized in order to achieve fine reproduction.

Figure 8:
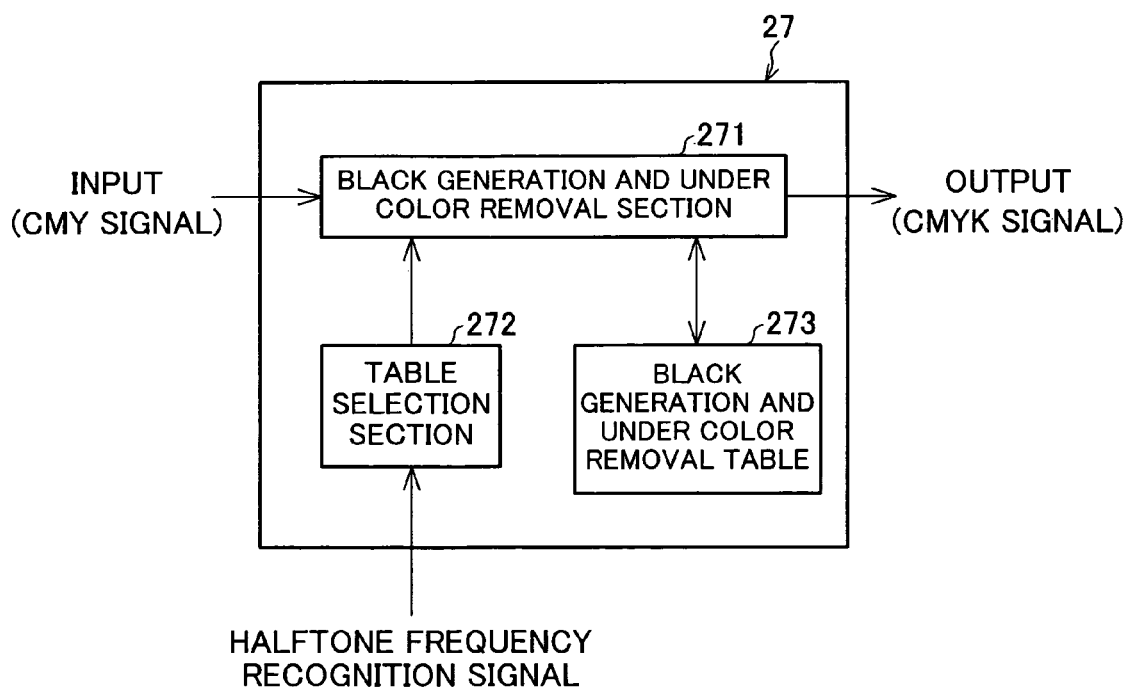
FIG. 8 is a block diagram illustrating an exemplary structure of a black generation and under color removal section of the image forming apparatus illustrated in FIG. 1.

The following describes an exemplary way of changing the black generation and under color removal process to be performed by the black generation and under color removal section 27, with reference to FIG. 8. In this example, two patterns, a pattern A (black generation and under color removal process A) and a pattern B (black generation and under color removal process B), of the black generation and under color removal process are changeable. As in the color correction section 26, the black generation and under color removal section 27 changes its process by switching the look-up tables. For this purpose, the black generation and under color removal section 27 illustrated in FIG. 8 is provided with a black generation and under color removal process section (color conversion process section) 271, a table selection section (process changing section) 272, and a black generation and under color removal table (color conversion process) 273.

In the structure of FIG. 8, when a CMY signal is inputted to the black generation and under color removal section 27, the black generation and under color removal processing section 271 reads, from the black generation and under color removal table 273, an output value corresponding to the inputted value. As a result, the CMY signal is converted into a CMYK signal. The black generation and under color removal table 273 includes two types of look-up tables: a table A (black generation pattern A) and a table B (black generation pattern B). Based upon the halftone frequency discrimination signal, the black generation and under color removal process section 271 switches the table to be refer to, so as to change the black generation and under color removal process.

The table selection section 272 switches the table A and the table B. Specifically, the table selection section 272 detects the halftone frequency discrimination signal supplied to the black generation and under color removal section 27. Then, based upon the detected signal, the table selection section 272 notifies the black generation and under color removal section 271 which table to refer to. In accordance with the notification by the table selection section 272, the black generation and under color removal processing section 271 switches the table to refer (access) to for the black generation and under color removal process.

The pattern A is set such that only a small amount of under color is removed. In this way, dark and vivid colors can be reproduced. Because the pattern A allows for dark and vivid color reproduction which cannot be realized with the combination of CMY colors alone, the pattern A is suitable for the black generation and under color removal process in super fine printing.

On the other hand, the pattern B is set such that a large amount of black is generated and a large amount of under color is removed. In this way, reproducibility of text is improved, and a sharp gray color is reproduced. The pattern B is thus suitable for a black generation and under color removal process in printing text (or text/printed-picture document) or ordinary printing.

The pattern A and the pattern B are switched for the black generation and under color removal process in the manner described below. In the case where the look-up tables are utilized in converting the CMY signal into the CMYK signal, the tables are switched based upon the halftone frequency discrimination signal, as described above. On the other hand, in the case where a calculation is utilized in converting the CMY signal into the CMYK signal, the calculation formula may be changed. Alternatively, in this case, the parameters for determining the amount of black to be generated or the amount of under color to be removed may be changed based upon the halftone frequency discrimination signal.

Further, in the structure described above (structure of FIG. 1), based upon the halftone frequency discrimination signal, the color correction process to be performed by the color correction section 26 and the black generation and under color removal process to be performed by the black generation and under color removal section 27 are changed simultaneously in order to change the color conversion processes. These processes, however, may be changed independently from each other (only one of the processes may be changed). In other words, the color conversion process of the above example may be either one of or both of the color correction process and the black generation and under color removal process.

As the foregoing described, in the image processing apparatus 20 illustrated in FIG. 1, the halftone frequency recognition section 23 recognizes the halftone frequency of the document. Then, based upon the recognized halftone frequency, the color conversion processes, such as the color correction process or the black generation and under color removal process, are changed.

Specifically, the halftone frequency recognition section 23 discriminates the high frequency halftone document from the rest of the documents (intermediate frequency halftone document, low frequency halftone document). Then, the halftone frequency recognition section 23 transmits a halftone frequency discrimination signal, which indicates the discrimination result, to the color correction section 26 and the black generation and under color removal section 27. With respect to the high frequency halftone document, the color correction section 26 selects the table A, and performs tone-oriented color reproduction for the high density area (dark black, vivid colors) so that the tones in the high density area are accurately reproduced. On the other hand, with respect to the low density area, density and color saturation are maintained so that pale colors are accurately reproduced. Further, with respect to documents other than the high frequency halftone documents, the color correction section 26 selects the table B. With the table B, the color correction section 26 performs the tone reproduction in such a way that contrast of the document is maintained. In this way, for example, text or graph is accurately reproduced.

Further, with respect to the high frequency halftone document, the black generation and under color removal section 27 selects the pattern A. The pattern A is set so that only a small amount of under color is removed, with the result that dark and vivid colors become reproducible. On the other hand, with respect to documents other than the high frequency halftone document, the black generation and under color removal section 27 selects the pattern B. The pattern B is set so that (i) a large amount of black is generated and (ii) a large amount of under color is removed, with the result that reproducibility of text is improved, and sharp gray colors are reproduced.

The image processing apparatus illustrated in FIG. 1 changes the color conversion process solely based upon the recognized halftone frequency. In other words, the image processing apparatus is different from a conventional apparatus that changes the color conversion process based upon a discriminated document type (discrimination of text document, picture document, text/picture document, etc.). Thus, the color conversion process is changed based solely upon the halftone frequency of the halftone area. Therefore, it is not so important whether the document contains a text area.

This is because the effect of image quality improvement by the switching of the color conversion process is normally small in the text areas but is large in the halftone areas. Therefore, the effects of the present invention are achieved even when the color conversion process is changed based solely upon the halftone frequency of the halftone areas.

Further, as a modification example of the image processing apparatus of the present invention, the color conversion process may be changed based upon a combination of a recognized halftone frequency and a discriminated document type so that a more suitable color conversion process is selected. The following describes such modification example.

Figure 9:
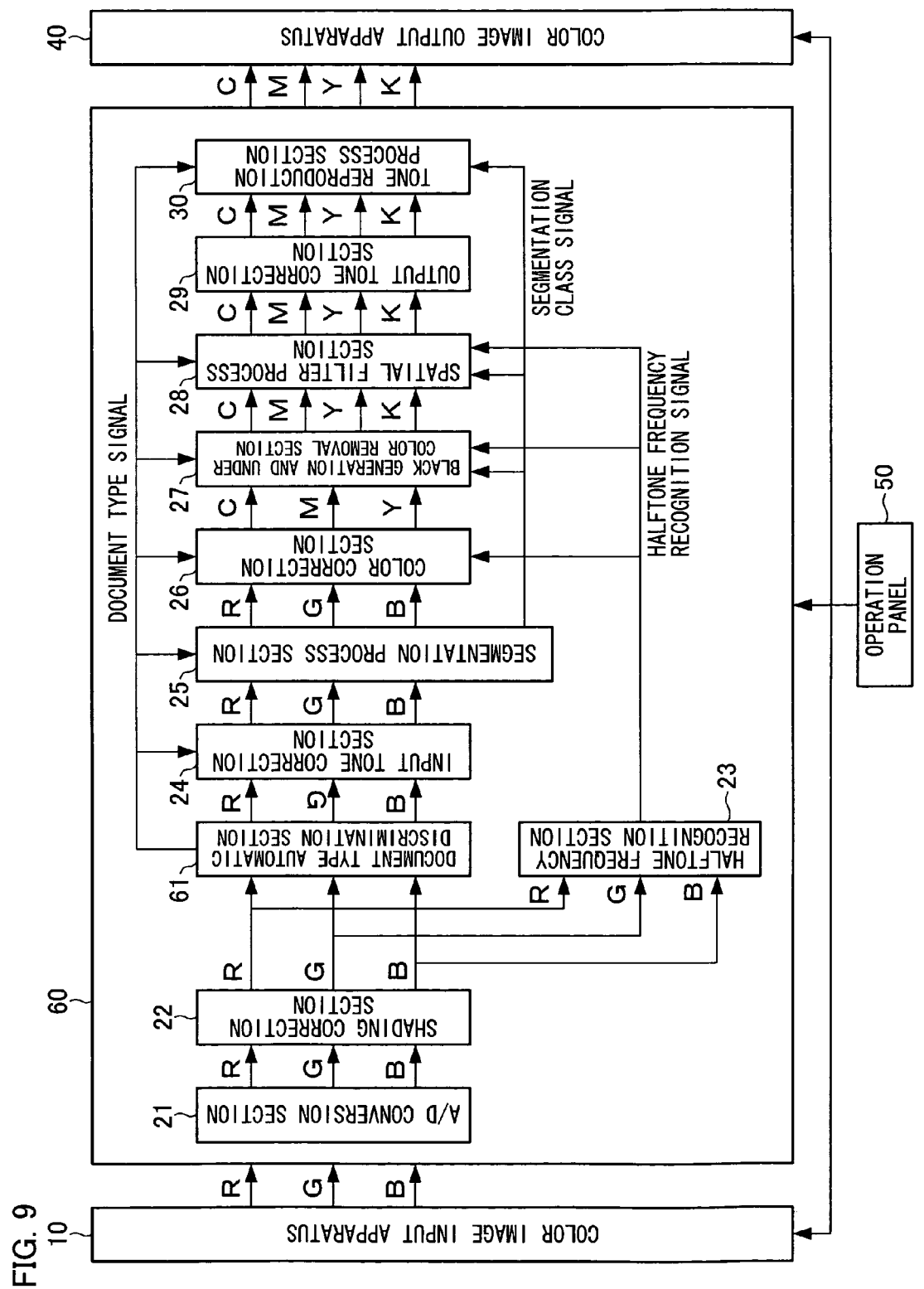
FIG. 9 is a block diagram illustrating a structure of a main part of an image forming apparatus according to another embodiment of the present invention.

FIG. 9 illustrates a structure of an image forming apparatus that changes the color conversion process based upon a recognized halftone frequency and a discriminated document type. The image forming apparatus of FIG. 9 is constituted of a color image input apparatus 10, an image processing apparatus 60, a color image output apparatus 40, and an operation panel 50.

The image processing apparatus 60 has the same structure as the image processing apparatus 20 illustrated in FIG. 1 except that a document type automatic discrimination section 61 is provided between the shading correction section 22 and the input tone correction section 24. The document type automatic discrimination section 61 discriminates a document type of a supplied document image by determining whether the document is a text document, a printed-picture document, a photographic-picture document, or a text/printed-picture document, which is a combination of these documents.

In the image processing apparatus 60 provided with the document type automatic discrimination section 61, based upon the document type discriminated by the document type automatic discrimination section 61, the input tone correction section 24 removes density of the page-background or adjusts the image quality (e.g., contrast).

Based upon the discriminated document type, the document type automatic discrimination section 61 transmits a document type signal, which indicates the type of the document image, to the input tone correction section 24, the segmentation process section 25, the color correction section 26, the black generation and under color removal section 27, the spatial filter process section 28, and the tone reproduction process section 30.

The following describes a case where two kinds of document modes, a printed-picture mode and a text/printed-picture mode, are predefined for discriminating the document type (with respect to photographic-picture, it is not necessary to change the process because the photographic-picture contains no halftone frequency). In the following description, three types of halftone frequencies are recognized: high frequency halftone, intermediate halftone, and low frequency halftone.

Based upon a combination of the document type signal supplied by the document type automatic discrimination section 61 and the halftone frequency discrimination signal supplied by the halftone frequency recognition section 23, the image processing apparatus 60 changes the processes to be performed by the color correction section 26 and the black generation and under color removal section 27.

Specifically, if the halftone frequency recognition section 23 determines the halftone frequency as the high frequency halftone, then the color correction process A using the color correction table A, and the black generation and under color removal process A using the pattern A are performed (regardless the document type). If the halftone frequency recognition section 23 determines the halftone frequency as the low frequency halftone, then the color correction process B using the color correction table B, and the black generation and under color removal process using the pattern B are performed (regardless the document type). Finally, if the halftone frequency recognition section 23 determines the halftone frequency as the intermediate frequency halftone, then, the color correction process A and the black generation and under color removal process A are performed in the case of the printed-picture mode, and the color correction process B and the black generation and under color removal process B are performed in the case of the text/printed-picture mode. Table 1 below shows settings of the processes. The color correction processes A, B and the black generation and under color removal processes A, B are the same processes as those described above. Further, for the purpose of comparison, Table 1 also shows settings of a conventional process in which the color conversion process are changed based upon the discriminated document type (in the case of the printed-picture mode, the conversion process is performed according to the color correction table A and the black generation pattern A, whereas in the case of the text/printed-picture mode, the color conversion process is performed according to the color correction table B and the black generation pattern B). In the table, the color correction table A is indicated as color A, the color correction table B is indicated as color B, the black generation pattern A is indicated as black A, and the black generation pattern B is indicated as black B.

As shown in Table 1, if it is determined that the document mode is the printed-picture mode and the halftone frequency is the low frequency halftone, then the processes are performed according to the color correction table B and the black generation pattern B. Therefore, in comparison with the conventional example, the text and graph are reproduced more desirably, and the reproducibility of gray colors are improved. Accordingly, the image quality is improved.

On the other hand, if it is determined that the document mode is the text/printed-picture mode and the halftone frequency is the high frequency halftone, then the processes are performed according to the color correction table A and the black generation pattern A. Therefore, in comparison with the conventional example, the tones of high density areas (dark black, vivid colors) are reproduced more accurately, the reproducibility of pale colors of low density areas is improved, and reproduction of dark colors and vivid colors becomes possible. Accordingly, the image quality is improved.

TABLE 1

EXEMPLARY SETTINGS COMBINING DOCUMENT MODE AND HALFTONE FREQUENCY

| HALFTONE FREQUENCY | PRINTED-PICTURE MODE | | | TEXT/PRINTED-PICTURE MODE | | |
|---|---|---|---|---|---|---|
| | HIGH FREQUENCY HALFTONE | INTERMEDIATE HALFTONE FREQUENCY | LOW FREQUENCY HALFTONE | HIGH FREQUENCY HALFTONE | INTERMEDIATE HALFTONE FREQUENCY | LOW FREQUENCY HALFTONE |
| CONVENTIONAL COMBINATION | COLOR CORRECTION TABLE A (COLOR A) BLACK GENERATION PATTERN A (BLACK A) | | | COLOR CORRECTION TABLE B (COLOR B) BLACK GENERATION PATTERN B (BLACK B) | | |

TABLE 1-continued

EXEMPLARY SETTINGS COMBINING DOCUMENT MODE AND HALFTONE FREQUENCY

| HALFTONE FREQUENCY | PRINTED-PICTURE MODE | | | TEXT/PRINTED-PICTURE MODE | | |
| --- | --- | --- | --- | --- | --- | --- |
| | HIGH FREQUENCY HALFTONE | INTERMEDIATE HALFTONE FREQUENCY | LOW FREQUENCY HALFTONE | HIGH FREQUENCY HALFTONE | INTERMEDIATE HALFTONE FREQUENCY | LOW FREQUENCY HALFTONE |
| COMBINATION OF FIG. 7 | COLOR A BLACK A | COLOR A BLACK A | COLOR B BLACK B | COLOR A BLACK A | COLOR B BLACK B | COLOR B BLACK B |
| COMPARISON OF IMAGE QUALITY | = | = | ++ | ++ | = | = |

(where "=" indicates "no difference" and "++" indicates "image quality is improved")

Figure 10:
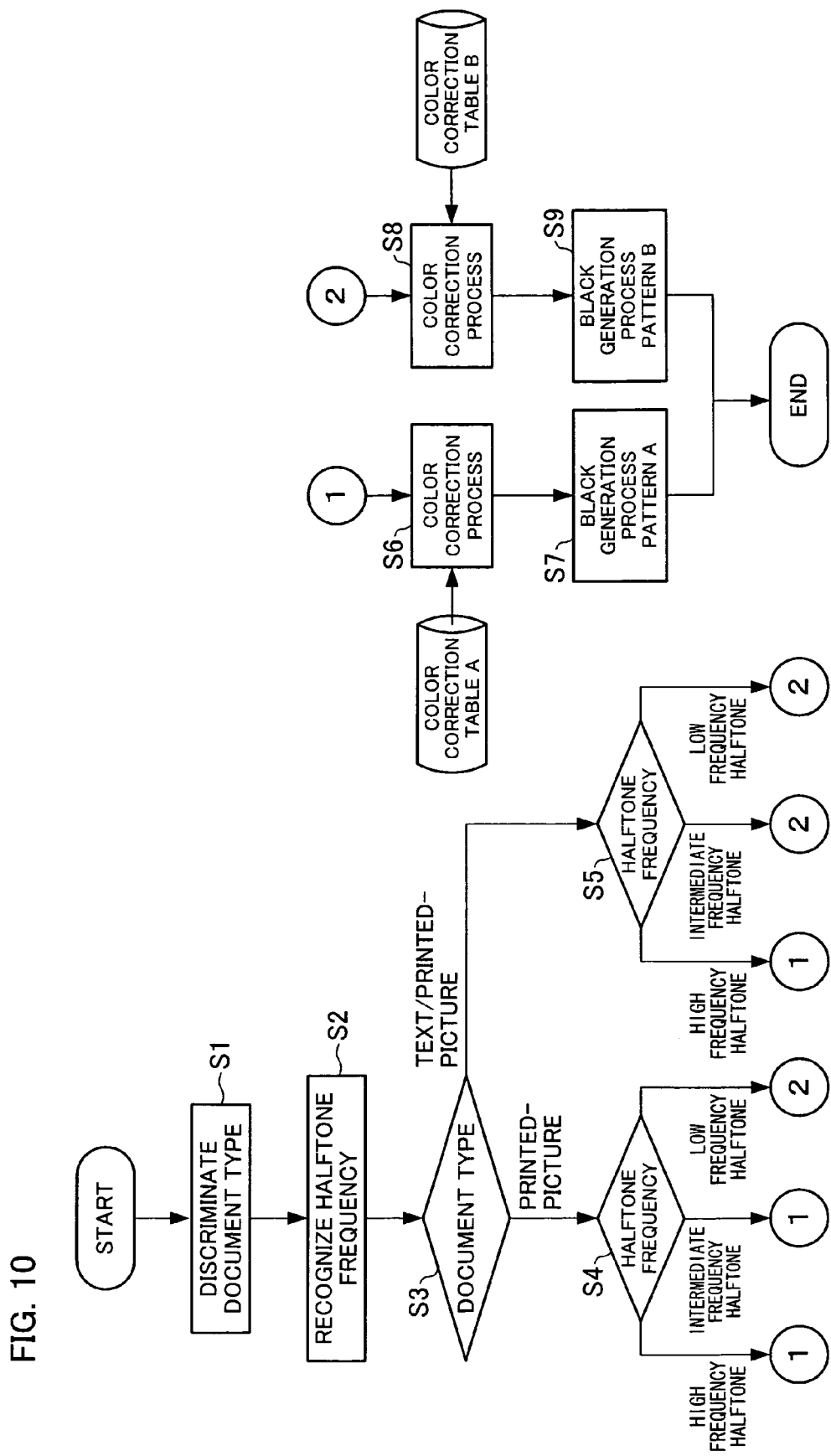
FIG. 10 is a flow chart showing a flow of an image conversion process performed by the image forming apparatus illustrated in FIG. 9.

FIG. 10 is a flow chart of the color conversion process performed in the image processing apparatus 60. In S1, the document type automatic discrimination section 61 discriminates the document type. In S2, the halftone frequency recognition section 23 recognizes the halftone frequency. In S3, if the document type discriminated in S1 is the printed-picture, then the process sequence goes to S4. On the other hand, if the document type discriminated in S1 is the text/printed-picture, then the process sequence goes to S5.

In S4, if the halftone frequency is recognized as the high frequency halftone or the intermediate frequency halftone, then the process sequence goes to S6. On the other hand, if the halftone frequency is recognized as the low frequency halftone, then the process sequence goes to S8. Further, in S5, if the halftone frequency is recognized as the high frequency halftone, then the process sequence goes to S6. On the other hand, if the halftone frequency is recognized as the intermediate frequency halftone or the low frequency halftone, then the process sequence goes to S8.

In S6, the color correction process is performed according to the color correction table A. Then, in S7, the black generation process is performed according to the pattern A. On the other hand, in S8, the color correction process is performed according to the color correction table B. Then, in S9, the black generation process is performed according to the pattern B.

Such arrangement is advantageous in the following points. First, in the case of the printed-picture document with the low frequency halftone (e.g., full-page advertisement of newspaper), with the conventional arrangement, the process for the printed-picture is performed by placing importance on reproduction of tones. This causes the overall reproduction to be pale and have poor color saturation. In contrast, with the present arrangement, the document is reproduced while the overall contrast and colors are maintained. This improves the image quality of reproduction significantly.

Further, in the case of the text/printed-picture document with the high frequency halftone (e.g., a mixture of text and pictures of a catalog), with the conventional arrangement, the process for normal printing is performed. This may not accurately reproduce tones of the high density areas. In contrast, with the present arrangement, importance is placed on reproduction of tones, and therefore the image quality is improved.

Further, in the case where the color conversion process is changed based upon the recognized halftone frequency and the discriminated document type, the recognition of halftone frequency may be performed only on documents containing halftone frequency, such as the printed-picture document or the text/printed-picture document. With this arrangement, the process to be performed on documents containing no halftone frequency (halftone dot) would not be changed based upon a halftone frequency. This prevents deterioration of image quality.

In the above structure (structure of FIG. 9), both the color correction process of the color correction section 26 and the black generation and under color removal process of the black generation and under color removal section 27 are changed based upon the document type signal and the halftone frequency discrimination signal. However, as in the structure of FIG. 1, the processes may be changed independently from each other (only one of the processes may be changed).

The document type automatic discrimination section 61 may discriminate the document type using a known method taught in, for example, Japanese Unexamined Patent Publication No. 2002-232708. However, the method for discriminating the document type is not limited to a particular method. The following briefly describes the method for discriminating the document type taught in Japanese Unexamined Patent Publication No. 2002-232708. The method includes steps (1) to (7):

(1) Calculating a minimum density value and a maximum density value of an n×m block containing a current pixel.

(2) Calculating a maximum density difference based upon the minimum density value and the maximum density value.

(3) Calculating a total density busyness, which is the sum of absolute values of the density differences between adjacent pixels.

(4) Comparing the maximum density difference with a maximum density difference threshold value. Comparing the total density busyness with a total density busyness threshold value. If the maximum density difference<the maximum density difference threshold value, and the total density busyness<the total density busyness threshold value, then the current pixel is determined to fall in a page-background/photographic-paper area. On the other hand, if the above conditions are not satisfied, then the current pixel is determined to fall in a text/halftone area.

(5) With regard to the pixel determined to fall in the page-background/photographic-paper area, the maximum density difference is compared with the page-background/photographic-paper determination threshold value. If the maximum density difference<page-background/photographic-paper determination threshold value, then the pixel is determined to fall in a page-background area. On the other hand, if the above condition is not satisfied, then the pixel is determined to fall in the photographic-paper area.

(6) With regard to the pixel determined to fall in the text/halftone area, the total density busyness is compared with a product of the maximum density difference and the text/halftone determination threshold value. If the total density congestion degree<the product of the maximum density difference and the text/halftone determination threshold value, then the pixel is determined to fall in a text area. On the other hand, if the above condition is not satisfied, then the pixel is determined to fall in a halftone area.

(7) The number of determined pixels is counted and is compared with predetermined threshold values for the page-background area, the photographic-paper area, the halftone area, and the text area to determine the type of the entire document. For example, if the percentage of the text area and the percentage of the halftone area are equal to or greater than their respective threshold values, then the document is determined as the text/halftone document (text/printed-picture document). Note that, provided that the accuracy of detection increases from the photographic-picture, halftone, and text, in the order as listed, the threshold values for the page-background area, the photographic-paper area, the halftone area, and the text area may be set as follows: if the percentage of the text area with respect to the entire pixels is 30%, then the document is determined as the text document; if the percentage of the halftone area with respect to the entire pixels is 20%, then the document is determined as the halftone document (printed-picture document); and if the percentage of the photographic-picture area with respect to the entire pixels is 10%, then the document is determined as the photographic-picture document.

To discriminate the document type, the document may be scanned in advance. Alternatively, image data that is temporarily stored in memory means (e.g., hard disk) may be utilized.

Further, the discrimination process of the document type is not limited to the automatic discrimination performed by the apparatus. Alternatively, a user may manually select an appropriate image mode for the document from a set of image modes (text mode, text/picture mode, picture mode, etc.) that are predetermined in an operation panel of digital copying-machines/Multi-Function Printers. In this case, the document type discrimination section is optional, and the document type signal is discriminated by the CPU.

Further, as another modification example of the image processing apparatus of the present invention, in order to perform a more suitable color conversion process, the color conversion process may be changed based upon a combination of the halftone frequency recognition process and the segmentation process. The following describes this modification.

Figure 11:
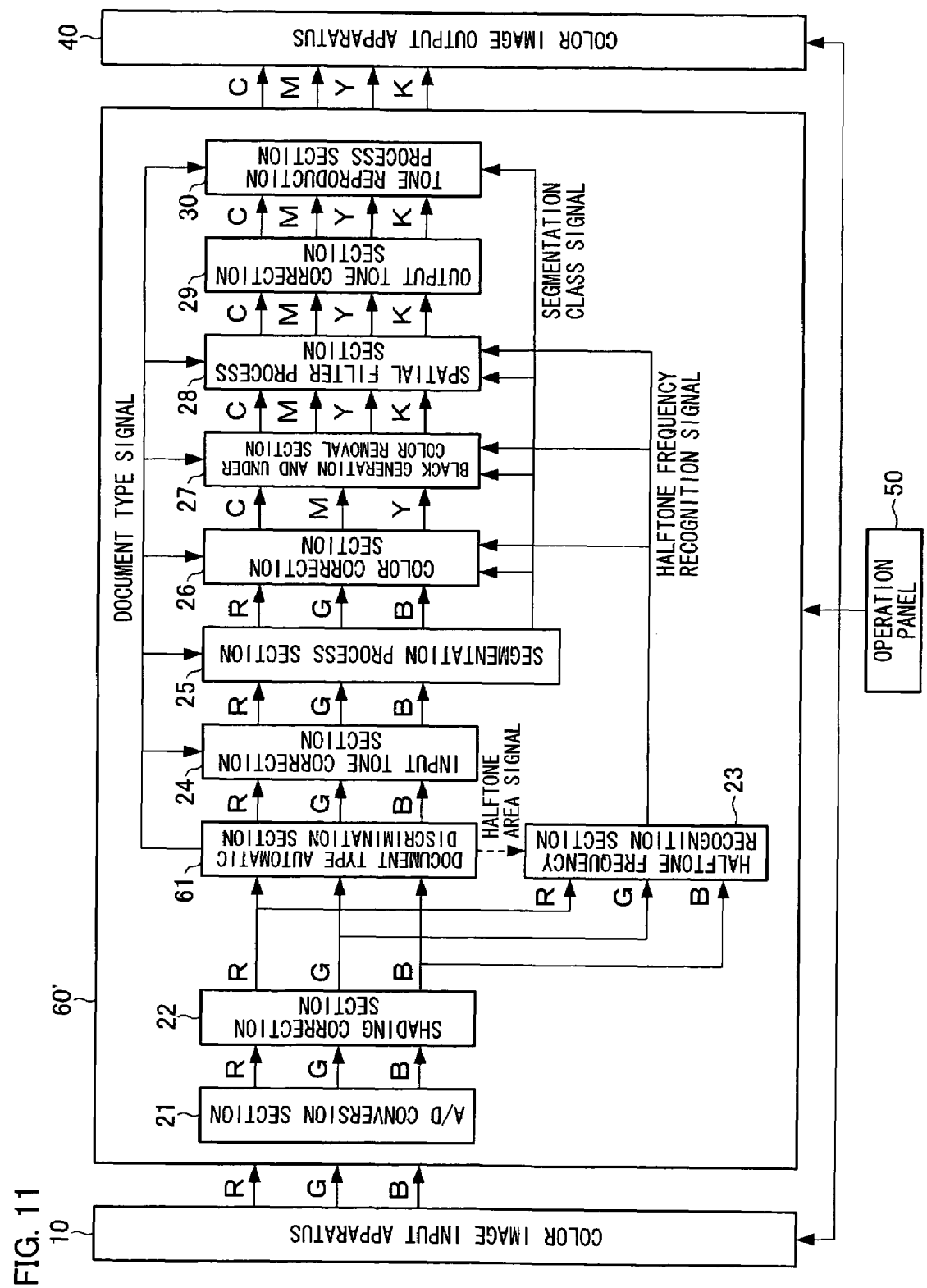
FIG. 11 is a block diagram illustrating a structure of a main part of an image forming apparatus according to yet another embodiment of the present invention.

FIG. 11 illustrates a structure of an image forming apparatus that changes the color conversion process based upon the result of the halftone frequency recognition process and the result of the segmentation process. The image forming apparatus of FIG. 11 is constituted of a color image input apparatus 10, an image processing apparatus 60', a color image output apparatus 40, and an operation panel 50.

As with the image processing apparatus 60 illustrated in FIG. 9, the image processing apparatus 60' is provided with a document type automatic discrimination section 61 in between the shading correction section 22 and the input tone correction section 24. The image process apparatus 60' is different from the image processing apparatus 60 in the following points. First, in the image process apparatus 60', the document type automatic discrimination section 61 transmits, based upon the discriminated document type, a halftone area signal, indicative of the halftone area, to the halftone frequency recognition section 23. Second, the segmentation process section 25 transmits the segmentation signal not only to the spatial filter process section 28 and the tone reproduction process section 29 but also to the color correction section 26 and the black generation and under color removal section 27.

Accordingly, with the image processing apparatus 60', the color conversion process is changed based upon the recognized halftone frequency only with respect to the halftone area. Thus, first, the halftone areas are extracted based upon the segmentation class signal, and then the halftone frequency recognition process is performed only on the halftone areas so that the halftone frequencies are recognized precisely.

In the image processing apparatus 60', the color conversion process is changed based upon a combination of the result of the halftone frequency recognition process and the result of the segmentation process in the manner described below. With the image processing apparatus 60', a halftone area is discriminated based upon the halftone area signal transmitted from the document type automatic discrimination section 61. Then, with respect to the halftone area, the color conversion process is changed based upon the result of the halftone frequency recognition process.

Specifically, the color correction process A using the table A and the black generation and under color removal process A using the pattern A are performed on the halftone area having the high frequency halftone, whereas the color correction process B using the table B and the black generation and under color removal process B using the pattern B are performed on the halftone area having the low frequency halftone. Thus, a suitable color conversion process is performed for the halftone area having the high frequency halftone and the halftone area having the low frequency halftone. Further, with respect to the halftone area having the intermediate frequency halftone, an intermediate process of those performed on the halftone area having the high frequency and the halftone area having the low frequency is performed. Specifically, one of the following combination is performed on the halftone area having the intermediate halftone frequency: the color correction process A using the table A and the black generation and under color removal process B using the pattern B; and the color correction process B using the table B and the black generation and under color removal process A using the pattern A. This reduces discontinuity caused by changing the processes, even if the document contains different halftone frequencies. In this case, the color correction section 26 and the black generation and under color removal section 27 change the process for each area based upon (i) the segmentation class signal transmitted from the segmentation process section 25 and (ii) the halftone frequency discrimination signal transmitted from the halftone frequency recognition section 23.

This makes it possible to desirably reproduce colors of each segmented area in a sheet of document containing a plurality of halftone frequencies. Examples of such document include: a sheet of document containing a plurality of halftones with different halftone frequencies; and a document containing images which were printed out in different ways (e.g., a document constituted of an image printed by a laser printer and a print (printed-picture) pasted on the image, a scrap book constituted of a plurality of pasted printed-pictures).

Further, in the case where the halftone frequency recognition process is performed on the entire document, if a solid area that is not the halftone area contains a shadow area and a highlight area, the solid area may be erroneously discriminated as a halftone area. This may cause a problem in that a halftone frequency is recognized even when it does not exist. Such a problem can be prevented by performing the halftone frequency recognition process only on the halftone area.

Table 2 below shows the settings. For the purpose of comparison, Table 2 also shows settings of the conventional arrangement in which the color conversion process is changed based upon the discriminated document type (regardless the halftone frequency of the halftone, the color conversion process is performed on the halftone area using one of the following combinations: a color correction table A and a black generation pattern A; and a color correction table B and a black generation pattern B).

TABLE 2

EXEMPLARY SETTINGS FOR HALFTONE AREA

| HALFTONE FREQUENCY | HIGH FREQUENCY HALFTONE | INTER-MEDIATE FREQUENCY HALFTONE | LOW FREQUENCY HALFTONE |
|---|---|---|---|
| CONVENTIONAL ARRANGEMENT | COLOR CORRECTION TABLE A OR COLOR CORRECTION TALBE B BLACK GENERATION PATTERN A OR BLACK GENERATION PATTERN B | | |
| ARRANGEMENT OF FIG. 8 | TABLE A PATTERN A | TABLE A PATTERN B | TABLE B PATTERN B |

Figure 12:
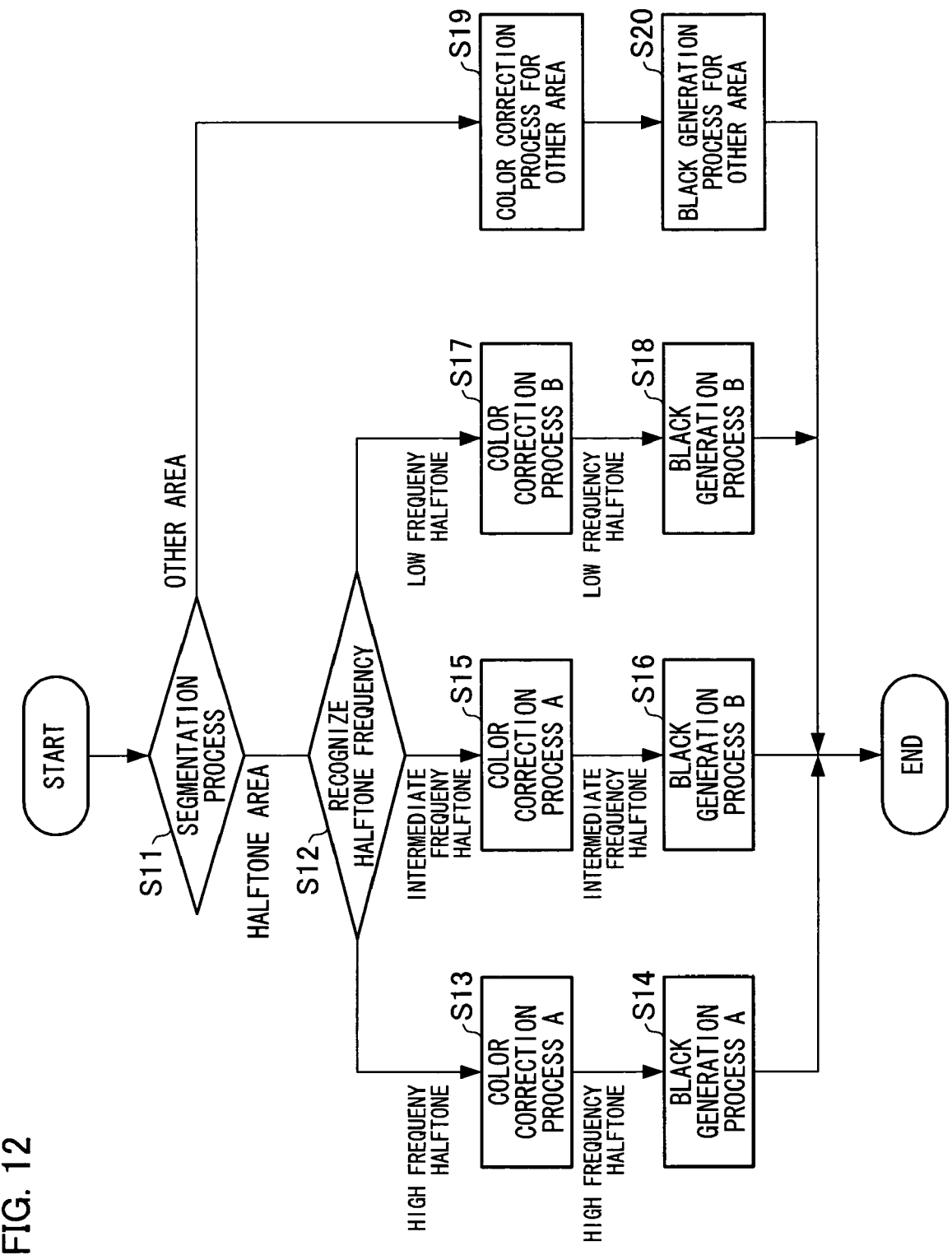
FIG. 12 is a flow chart showing a flow of an image conversion process performed by the image forming apparatus illustrated in FIG. 11.

FIG. 12 shows a flow chart of the color conversion process performed by the image processing apparatus 60'. According to the flow chart, in S11, the segmentation process section 25 performs the segmentation process so as to segment the document into a halftone area and other areas. For the halftone area, the process sequence goes to S12. For the other areas, the process sequence goes to S19.

In S12, the halftone frequency recognition section 23 performs the halftone frequency recognition process on the halftone area based upon the result of the document type discrimination process performed by the document type automatic discrimination section 61. If the halftone area is determined as the high frequency halftone, then the process sequence goes to S13. If the halftone area is determined as the intermediate frequency halftone, then the process sequence goes to S15. Finally, if the halftone area is determined as the low frequency halftone, then the process sequence goes to S17. In S13, the color correction process is performed using the color correction table A, and subsequently in S14, the black generation and under color removal process is performed using the pattern A. In S15, the color correction process is performed using the color correction table A, and subsequently in S16, the black generation and under color removal process is performed using the pattern B. In S17, the color correction is performed using the color correction table B, and subsequently in S18, the black generation and under color removal process is performed using the pattern B.

In S19, a color correction process for the other areas is performed. Subsequently in S20, a black generation and under color removal process for the other areas is performed.

Further, the image processing apparatus according to the present invention may change the color conversion process based upon a combination of (i) the result of the halftone frequency recognition process, (ii) the result of the segmentation process, and (iii) the result of the document type discrimination process. In this case, for example with respect to the intermediate frequency halftone area in the printed-picture document, the process may be changed to a combination of the color correction process A and the black generation process A according to the exemplary settings above. With regard to the printed-picture mode, it is likely that only a few text is contained, and that reproducibility of text is not so important. Therefore, the process is changed to place more importance on the tone continuity of a picture in the halftone area.

With regard to the segmentation process, steps (1) to (6) of the above-described method for discriminating the document type may be utilized to determine to which area a current pixel belongs, and the determination result may be used as the segmentation result. Further, the halftone frequency recognition section 23 may be provided parallel to the segmentation process section 25, instead of being provided parallel to the document type automatic discrimination section 61 as illustrated in FIG. 11. In this case, the document type automatic discrimination section 61 is optional, and the halftone frequency recognition section 23 may discriminate the halftone area based upon the segmentation class signal supplied by the segmentation process section 25, and perform the halftone frequency recognition process with respect to the discriminated halftone area.

In the structures illustrated in FIGS. 1, 9, and 11, the halftone frequency recognition section 23 is provided in all of the image processing apparatuses 20, 60, and 60'. Although the image processing apparatus according to the present invention is characterized in that the color conversion process is changed based upon the result of the halftone frequency recognition process, the result of the halftone frequency recognition process performed on the document may be supplied by an external device. In other words, it is not required for the image processing apparatus itself to include the halftone frequency recognition section.

For example, in the image forming apparatus constituted of the image reading apparatus and the image output apparatus, the image reading apparatus may be provided with means that corresponds to the halftone frequency recognition section 23, and the image output apparatus may be provided with means that corresponds to the color correction section 26 and the black generation and under color removal section 27. In this case, the image output apparatus corresponds to the image processing apparatus according to the present invention.

The image processing method according to the present invention may be realized in the form of software (applications program). In this case, the document type discrimination process and the halftone frequency recognition process are realized in the form of applications software, and the applications software is installed in a computer or a printer as a printer driver by which the color correction process and the black generation and under color removal process based upon a result of the document type discrimination process and a result of the halftone frequency recognition process are realized on software. Alternatively, not only the document type discrimination process and the halftone frequency recognition process but also the color correction process, the black generation and under color removal process, the spatial filter process, the tone reproduction process that are performed based upon the result of the document type discrimination process and the result of the halftone frequency recognition process may be realized in the form of application software.

Figure 13:
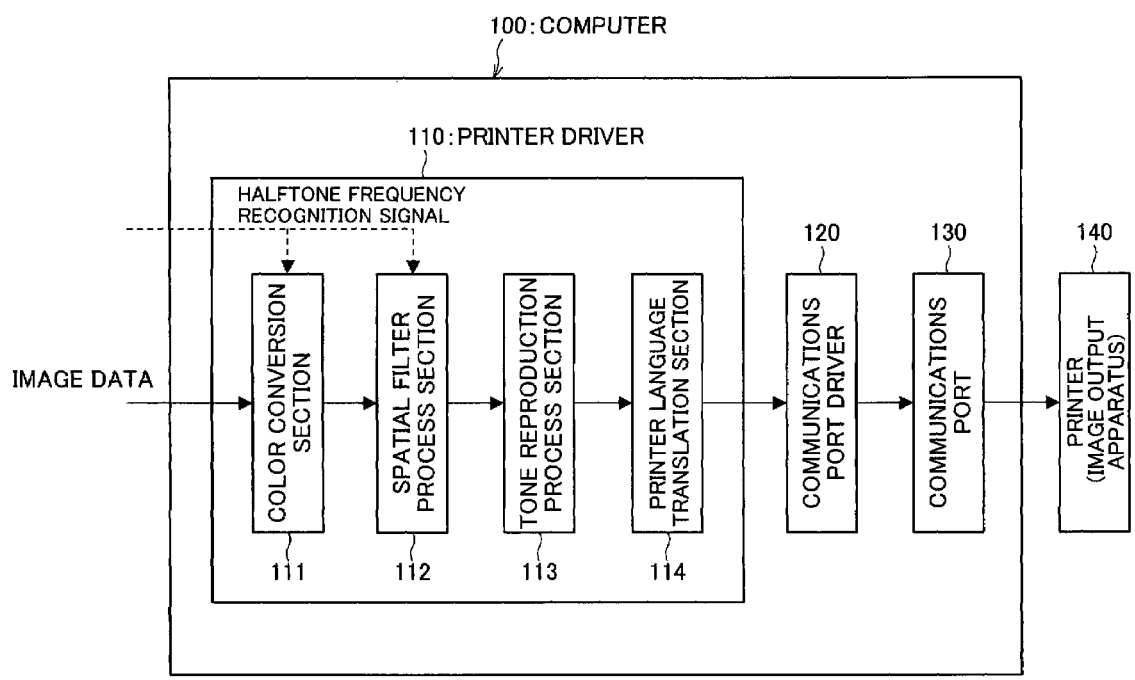
FIG. 13 is a block diagram illustrating a structure of an image forming apparatus, different from that of FIG. 1 adopting an image processing apparatus of the present invention.

As an exemplary process of the former, the following describes a process that is performed based upon the result of the halftone frequency recognition process, with reference to FIG. 13. As illustrated in FIG. 13, a computer 100 is provided with a printer driver 110, a communication port driver 120, and a communication port 130. The printer driver 110 is provided with a color conversion section 111, a spatial filter process section 112, a tone reproduction process section 113, and a printer language interpretation section 114. The color conversion section 111 performs the same processes as the color correction section 26 and the black generation and under color removal section 27, both of which are illustrated in FIG. 1 or elsewhere. Further, the spatial filter process section 112 performs the same process as the spatial filter process section 28 does, and the tone reproduction process section 113 the same process as the tone reproduction process section 30.

Further, the computer 100 is connected to a printer (image output apparatus) 140, and the printer 140 prints out an image according to image data supplied by the computer 100.

With respect to the image data created by the execution of a variety of applications programs in the computer, the above processes are performed by the color conversion section 111, the spatial filter process section 112, and the tone reproduction process section 113. After being processed by the color conversion section 111, the spatial filter process section 112, and the tone reproduction process section 113, the image data is converted into a printer language by the printer language interpretation section 114. Then, the printer language is supplied to the printer 140 via the communication port driver 120 and the communication port (e.g., RS-232C (recommended standard-232C), LAN) 130. The printer 140 may be realized by a digital multi-function printer that functions as a printer, a copying machine, and a facsimile.

Further, the present invention may be realized by a computer-readable storage medium storing a program to be executed by a computer. Specifically, the computer-readable storage medium may store the image processing method by which the color conversion process is performed based upon the result of the halftone frequency recognition process. This makes it possible to provide a portable storage medium storing a program for executing the image processing method by which an appropriate process is performed based upon the result of the halftone frequency recognition process.

The storage medium may be realized by a memory (not illustrated), for example, such as ROM or other program media, because the processes are performed by a microcomputer. Alternatively, the storage medium may be realized by readable program medium that is read by being inserted into a program reading unit provided as an external storage unit (not illustrated).

In either of the above cases, a microprocessor may access to the stored program to execute the program. Alternatively, the program may be read out, downloaded to a program storage area (not illustrated) of a microcomputer, and executed. In the latter case, a program needed for downloading is stored in the main apparatus in advance.

The program medium described above may be a program medium that can be separated from the main apparatus. Examples of such program medium include: tapes such as a magnetic tape or a cassette tape; disks including (i) magnetic discs such as a Floppy™ disk or a hard disk and (ii) optical discs such as CD-ROM, MO, MD, or DVD; cards such as an IC card (including a memory card), or an optical card; and semiconductor memories such as a mask ROM, EPROM (Erasable Programmable Read Only Memory), EEPROM (Electrically Erasable Programmable Read Only Memory), or flash ROM.

In this case, the system may be configured in such a way as to be connectable to communication networks including the Internet, and the program may be downloaded from the communications networks when necessary. In such case where the program is to be downloaded from the communications networks, the program needed for the downloading is either stored in the main apparatus in advance or supplied by another storage medium. The present invention may thus be realized by electrical transmission of the program code, or more concretely, in the form of computer data signals (data signal sequences) embedded in a carrier wave.

In order to perform the image processing method, the storage medium is read out by the program reading apparatus installed in a digital color image forming apparatus or in a computer system.

The computer system is constituted of: an image input apparatus such as a flatbed scanner, film scanner, or a digital camera; a computer that downloads a predetermined program to execute various processes such as the image processing method; an image display apparatus that displays a result of processing executed by the computer, such as a CRT (cathode-ray tube) display or a liquid crystal display; and a printer that outputs, on a paper, the result of processing executed by the computer. The computer system is further provided with a network card or a modem that functions as communication means for accessing to a server via networks.

In order to achieve the above object, an image processing apparatus of the present invention includes: a color conversion process section that converts color image data of a first color space into color image data of a second color space based on a predetermined color conversion process; and a process changing section that changes the color conversion process based upon a halftone frequency recognized from the color image data of the first color space.

With the above structure, the color conversion process for printing out the image is changed, based upon the halftone frequency of the halftone area, before the color conversion process (e.g., conversion from RGB into CMY, from CMY into CMYK, from RGB into CMYK) is performed on the image data containing the halftone area.

This makes it possible to, for example, perform a color conversion process suitable for super fine printing. Specifically, colors of image data containing a high frequency halftone are reproduced in such a way that tones of high-density areas (dark black, vivid colors) are not deteriorated, and pale colors of low-density areas are also accurately reproduced. On the other hand, colors of image data containing no high frequency halftone are reproduced such that contrast of the document is maintained to finely reproduce text, graph, or the like. This enables performance of the color conversion process suitable for printing text (or text/printed-picture document) or ordinary printing. The color conversion process is changed based upon the halftone frequency, which was not taken into consideration in conventional processes, so that an appropriate image process is performed based upon the document type or the halftone frequency of the halftone area. Accordingly, the image quality is improved.

Further, an image processing apparatus according to the present invention is adapted so that the color image data of the first color space is obtained by reading out a document; and the color conversion process section changes the color conversion process based upon (i) a type of the document and (ii) the halftone frequency recognized from the color image data of the first color space.

With the above structure, when the color conversion process is performed on image data containing a halftone area for printing out the image, the color conversion process is changed based upon the document type (e.g., printed-picture mode, text/printed-picture mode) and the halftone frequency of the halftone area. In this case, the halftone frequency is recognized only from a document containing a halftone, such as the printed-picture document or the text/printed-picture document. This prevents a problem in that a halftone frequency (halftone) would not be recognized from a document containing no halftone frequency. Moreover, the process would not be changed based upon the halftone frequency with respect to the document containing no halftone frequency (halftone). Thus, deterioration in image quality can be prevented.

Further, for example, if the document is determined as the high frequency halftone document, then the color conversion process suitable for super fine printing is performed. If the document is determined as the low frequency halftone document, then the color conversion process suitable for printing text or ordinary printing is performed. Finally, if the document is determined as the intermediate frequency halftone document, then either (i) the color conversion process suitable for super fine printing or (ii) the color conversion process suitable for printing text or ordinary printing is selected depending upon the document type.

Further, another image processing apparatus based upon the present invention is adapted so that, the color conversion process section changes the color conversion process based upon (i) a result of segmentation process, which indicates a result of segmentation that is performed to at least determine whether the color image data of the first color space belongs to a halftone area, and (ii) the halftone frequency recognized from the color image data of the first color space.

Further, in the image processing apparatus, the color conversion process section changes the color conversion process based upon the halftone frequency only with respect to an area that was determined as the halftone area in the color image data of the first color space.

With the above structure, based upon (i) the result of the segmentation process performed on the image data and (ii) the halftone frequency of the halftone area contained in the image data, the color conversion process is changed before the color conversion process is performed on the image data to print it out. In this case, the halftone frequency recognition process is performed only on the halftone area. This prevents erroneous recognition of a halftone area from the other areas. Moreover, with respect to the document containing no halftone area, the process would not be changed based upon the halftone frequency. Thus, deterioration in image quality can be prevented.

Further, for example, the color conversion process is changed based upon the halftone frequency only with respect to the area discriminated as the halftone area. This makes it possible to desirably reproduce colors of each segmented area of the document containing a plurality of halftone frequency areas, for example a print document containing a plurality of halftones with different halftone frequencies on one page, or a document containing images which were printed out in different ways (e.g., an image printed by a laser printer and having a pasted print (printed-picture), a scrap book with a plurality of pasted printed-pictures).

Further, in the image processing apparatus, the color conversion process section performs a color correction process on color image data of an RGB signal so as to convert the color image data of the RGB signal into color image data of a CMY signal.

Further, in the image processing apparatus, the color conversion process section performs a black generation and under color removal process on color image data of a CMY signal so as to convert the color image data of the CMY signal into color image data of a CMYK signal.

The image processing apparatus may be realized by a computer. In this case, the followings are included within the scope of the present invention: a program causing a computer to function as (i) the color conversion process section and (ii) the process changing section, so that the image processing apparatus is realized by the computer; a data signal sequence in which the program is embedded; and a storage medium that is readable by the computer storing the program.

With the present invention, an appropriate color conversion process is performed on a halftone area based upon the halftone frequency of the halftone area. Further, the present invention is applicable to, for example, color copying machines or color printers.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image processing apparatus, comprising:
   a color conversion process section that converts color image data of a first color space obtained by scanning a document into color image data of a second color space based on a predetermined color conversion process;
   a halftone frequency recognition section that calculates a halftone frequency of the document based on the color image data of a first color space; and
   a process changing section that changes the color conversion process against the color image data obtained by scanning the document based upon the halftone frequency calculated by the halftone frequency recognition section,
   wherein:
   the color image data of the first color space is obtained by reading out a document; and
   the color conversion process section changes the color conversion process based upon (i) a type of the document and (ii) the halftone frequency recognized from the color image data of the first color space.

2. An image processing apparatus as set forth in claim 1, wherein the color conversion process section performs a color correction process on color image data of an RGB signal so as to convert the color image data of the RGB signal into color image data of a CMY signal.

3. An image processing apparatus as set forth in claim 1, wherein the color conversion process section performs a black generation and under color removal process on color image data of a CMY signal so as to convert the color image data of the CMY signal into color image data of a CMYK signal.

4. An image processing apparatus, comprising:
   a color conversion process section that converts color image data of a first color space obtained by scanning a document into color image data of a second color space based on a predetermined color conversion process;
   a halftone frequency recognition section that calculates a halftone frequency of the document based on the color image data of a first color space; and
   a process changing section that changes the color conversion process against the color image data obtained by scanning the document based upon the halftone frequency calculated by the halftone frequency recognition section,
   wherein the color conversion process section changes the color conversion process based upon (i) a result of segmentation process, which indicates a result of segmentation that is performed to at least determine whether the color image data of the first color space belongs to a halftone area, and (ii) the halftone frequency recognized from the color image data of the first color space.

5. An image processing apparatus as set forth in claim 4, wherein the color conversion process section changes the color conversion process based upon the halftone frequency only with respect to an area that was determined as the halftone area in the color image data of the first color space.

6. An image processing method, in which a color conversion process is performed so as to convert color image data of a first color space into color image data of a second color space, said method comprising the steps of:

obtaining the color image data of the first color space by reading out a document; and changing the color conversion process based upon (i) a type of the document and (ii) a halftone frequency recognized from the color image data of the first color space.

7. An image processing method, in which a color conversion process is performed so as to convert color image data of a first color space into color image data of a second color space, said method comprising the step of changing the color conversion process based upon (i) a result of segmentation process, which indicates a result of segmentation that is performed to at least determine whether the color image data of the first color space belongs to a halftone area, and (ii) a halftone frequency recognized from the color image data of the first color space.

8. An image processing apparatus, comprising:

a color conversion process section that converts color image data of a first color space obtained by scanning a document into color image data of a second color space based on a predetermined color conversion process;

a halftone frequency recognition section that calculates a halftone frequency of the document based on the color image data of a first color space; and a process changing section that changes the color conversion process against the color image data obtained by scanning the document based upon the halftone frequency calculated by the halftone frequency recognition section, wherein, for a high frequency halftone document, the color conversion process section performs tone-oriented color reproduction for a high density area such that the tones in the high density area are accurately reproduced, and the color conversion process section performs tone-oriented color reproduction for a low density area such that density and color saturation are maintained and pale colors are accurately reproduced, and wherein the color conversion process section performs tone-oriented color reproduction for documents other than high frequency halftone documents such that contrast of the documents is maintained.

9. An image processing apparatus, comprising:

a color conversion process section that converts color image data of a first color space obtained by scanning a document into color image data of a second color space based on a predetermined color conversion process;

a halftone frequency recognition section that calculates a halftone frequency of the document based on the color image data of a first color space; and a process changing section that changes the color conversion process against the color image data obtained by scanning the document based upon the halftone frequency calculated by the halftone frequency recognition section, wherein the color conversion process section performs a black generation and under color removal process on color image data of a CMY signal so as to convert the color image data of the CMY signal into color image data of a CMYK signal, wherein, for a high frequency halftone document, the black generation and under color removal process removes only a small amount of under color, resulting in reproducible dark and vivid colors, and wherein, for documents other than high frequency halftone documents, the black generation and under color removal process generates a large amount of black color and removes a large amount of under color such that reproducibility of text is improved and sharp gray colors are reproduced.

* * * * *